Sept. 18, 1934.    F. H. HOPKINS    1,974,274
SAFETY VALVE
Filed April 11, 1932
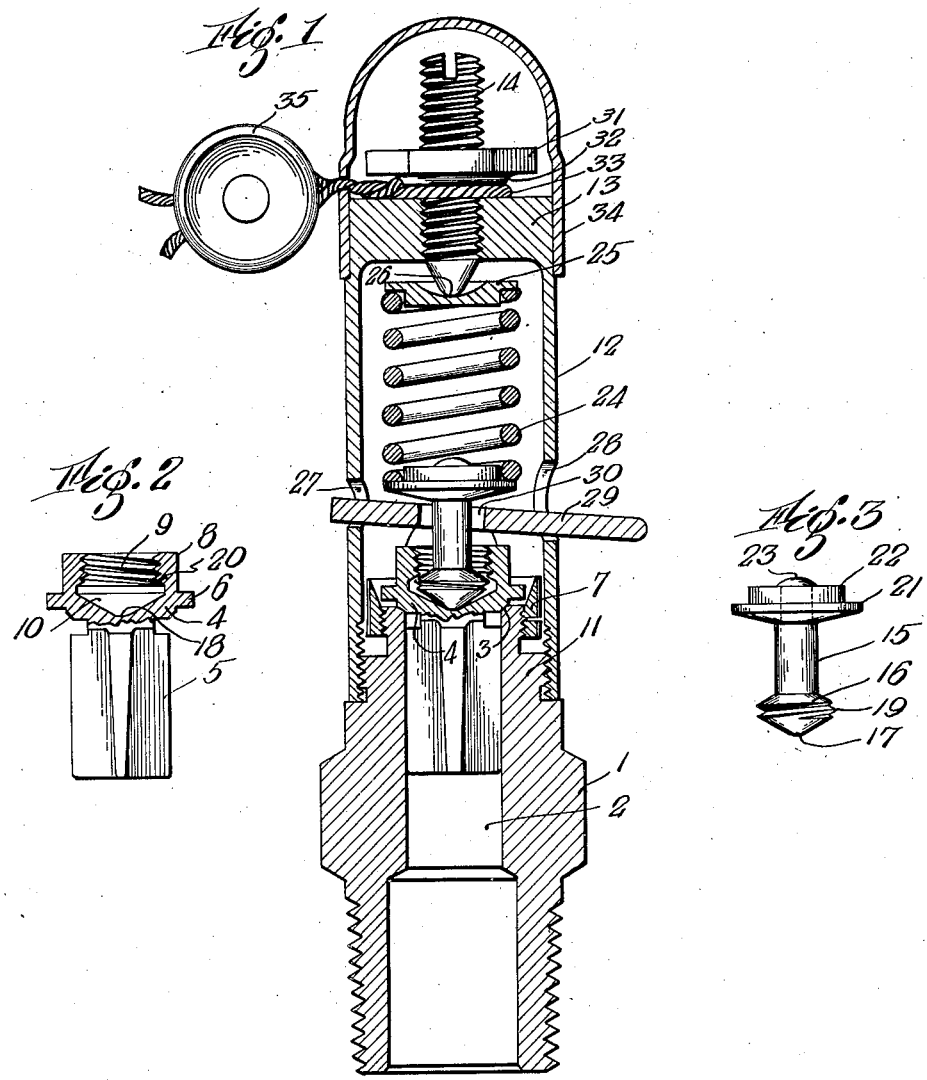
Inventor
Frank H. Hopkins
By Roberts Cushman & Woodberry.
his Attorneys.

Patented Sept. 18, 1934

1,974,274

UNITED STATES PATENT OFFICE 1,974,274

SAFETY VALVE

Frank H. Hopkins, Bridgeport, Conn., assignor to Consolidated Ashcroft Hancock Company, New York, N. Y., a corporation of Delaware Application April 11, 1932, Serial No. 604,438

4 Claims. (Cl. 137—53)

This invention pertains to safety valves of that type wherein the valve feather is normally held to its seat by a spring, or equivalent means, acting upon the feather through the medium of a valve spindle, and having means for lifting the valve from its seat manually, said latter means also acting upon the valve through the medium of the spindle.

The provision of means for lifting the valve manually from its seat is required by law in many places in order that the feather may be raised at intervals to prevent it from becoming attached to its seat by rust or scale; another common provision of law being that the valve shall be sealed up after initial adjustment to prevent readjustment of the loading means by the user.

Commonly, when the feather is urged toward its seat by means of a spring-loaded spindle, the feather is assembled with the spindle in such a way as to permit relative tipping of the feather and spindle so that the feather may seat squarely on its seat. In some valves the feather is connected to the spindle by providing the feather with a cavity in which a head on the end of the spindle is seated, the head being prevented from escaping from the cavity by an annular nut screwed into the upper part of the recess in the feather. While this mode of connection of the feather and spindle is easily accomplished in large valve structures, there is always some danger that the retaining nut will unscrew and allow the parts to loosen or separate, or, by turning in the other direction, will cause the parts to bind. Moreover, this mode of uniting the feather and spindle is difficult and substantially impractical as applied to small valves, for example, those less than one inch in diameter, by reason of the difficulty of designing parts of sufficient strength for use within the available space limits. While it has been proposed to provide a retaining pin for holding the feather to the spindle, for instance by drilling a hole through the assembled spindle and feather and loosely connecting the parts by a pin passing through these holes, such an arrangement does not always give all of the freedom of relative motion desired, and a pin is especially apt to be bent or cramped in the holes so as to prevent the feather from seating properly, thus resulting in leakage.

The principal object of the present invention is to provide a reliable connection between the valve spindle and feather which will ensure the desired relative freedom of motion so as to enable the feather to seat squarely under all conditions of use; which will be applicable to valves of substantially all sizes,—particularly to those of small size where reliability of operation is imperative but where the parts are necessarily small, and where cheapness and simplicity are desiderata and wherein the parts must be readily assembled or disassembled when, for example, it is desired to replace a worn feather.

A further object of the invention is to provide a valve construction wherein, in a simple and efficient way, provision is made for sealing the parts after adjustment of the spindle load so that they can not be tampered with by unauthorized persons. Other objects and advantages of the invention will be apparent from the following description taken in connection with the appended drawing wherein, by way of example, I have illustrated one desirable embodiment of the invention.

In the drawing

Fig. 1 is a vertical section through an assembled valve embodying the present improvements, the valve feather being shown seated;

Fig. 2 is a vertical section of the valve feather removed from the valve casing; and Fig. 3 is an elevation of the valve spindle removed from the casing.

Referring to the drawing, the valve illustrated is of a type commonly employed on air compressors and sterilizers, but it is to be understood that the invention is not limited to this particular type of valve or to the size or relative dimensions illustrated.

The illustrated embodiment of the invention comprises a casing 1 provided with means for attaching it to a pipe, boiler or other supply of fluid under pressure and having the fluid passage 2 which terminates at the annular valve seat 3. The valve feather 4 cooperates with this seat, such feather preferably being of unitary, one-piece construction and comprising the usual guide fins 5 adapted to fit in the passage 2 for guiding the valve in its movements to and from its seat. This feather also preferably comprises the radial flange 6 which, when the valve is seated, is spaced from the upper end of the casing member 1 so as to provide a huddling chamber,—while a blow-down ring 7, having screw-threaded connection to the upper part of the casing 1, surrounds the flange 6 at the proper distance to provide for the desired lift and blow-down of the valve.

In accordance with the present invention the valve feather 4 is provided with an integral upward extension 8 having an internally screw-threaded passage 9 leading to a cavity 10 in the body of the feather, it being noted that the cavity 10 at its point of greatest diameter exceeds the diameter of the passage 9 as measured at the root diameter of the screw threads. Preferably the walls of the cavity 10 comprise two truncated conical surfaces placed base to base, the apex of the lower conical surface being smoothly rounded to form a concave seat surface 18, while the upper conical surface merges into the lowermost of the screw threads, its angle of slope being the same as that of the screw threads.

The valve casing 1 is screw threaded at 11 for engagement with the screw-threaded lower portion of a bonnet 12 forming the upper part of the valve structure and having a cavity for housing the valve loading means. This bonnet 12 is preferably closed at its top by an end or top member 13 which has a central screw-threaded opening for the reception of the adjusting screw 14.

The means for loading the valve feather comprises a valve spindle 15 (Fig. 3) having a head at its lower end, preferably of a shape substantially like that of two cones or truncated cones placed base to base, the apex of the lower cone being rounded, as indicated at 17, while the conical surface of the upper cone, as shown at 16, merges into the outer surface of the spindle proper.

The rounded lower end 17 of the head of the spindle is adapted to seat against the concave seat surface 18 at the bottom of cavity 10, it being noted that the apex angle of the lower cone of the head of the spindle is somewhat less than the apex angle of the lower conical surface of the cavity 10, as clearly shown in Fig. 1.

At the part of the head of the spindle which is of maximum diameter, that is to say, at the junction of its constituent conical parts, said head is provided with a screw-threaded portion 19, the thread being of such pitch and the head being of such diameter at this point that the head may be screwed down into the passage 9 of the valve feather. The length of the screw-threaded portion of the passage 9 is such that when the head of the spindle has been screwed down until the end 17 bears against surface 18 of the feather, the screw threads at 19 of the head will have disengaged the threads of the passage 9. As the maximum diameter of the cavity 10 is greater than that of the spindle head, the feather is free to rock on the spindle in any direction when the parts are thus assembled. If, when the parts have been thus assembled the spindle head is lifted without turning it, the surface 16 will find even seat at the point 20 against which it may bear, the annular seat surface 20 being equal in radial width to the difference between the root and outside diameters of the screw thread in the passage 9.

It may be noted that the passage 9 is of substantial axial length, such length preferably being approximately as great as the depth of the cavity 10, whereas the axial length of the screw-threaded portion 19 of the spindle head is relatively short. Thus the screw-threaded portion of the passage is of ample length to prevent accidental separation of the head from the feather while at the same time the cavity need not be unduly deep in order to provide the desired free rocking of the head relatively to the spindle when the screw threads at 19 are disengaged from the screw threads of the passage. It is further clear that by reason of the conical upper surface of the spindle head, the latter is automatically centered with respect to the passage 9 so that no difficulty is experienced in engaging the screw threads 19 with those of the passage when it is desired to remove the feather from the spindle.

The spindle 15 is furnished with a shoulder near its upper end upon which a collar 21 is seated. Above this abutment collar is placed a washer 22, and the upper end of the spindle is conveniently headed over onto this washer, as shown at 23, so as to hold the parts in assembled relation.

The coiled compression loading spring 24 is seated at its lower end against the shoulder provided by collar 21, being held in proper concentric relation by the washer 22. The upper end of this spring supports an abutment plate 25, preferably having a central cavity in which the lower rounded end 26 of the adjusting screw 14 seats.

The bonnet 12 is furnished with openings 27 and 28 at opposite sides, the latter opening being elongate in a vertical direction, and a valve lifting lever 29 extends through these openings, such lever having an aperture 30 for the passage of the spindle 15. By lifting the longer end of this lever its opposite end fulcrums upon the lower surface of the opening 27 while its central part comes against the abutment member 21, thus lifting the valve from its seat by means of the spindle 15.

The adjusting screw 14 preferably is provided with a locking nut 31 which is chamfered or recessed at its lower side, as shown at 32, so as to form a button-like part intermediate the upper end of the nut and the top of the member 13 around which the bight of a flexible sealing wire or cord 33 is placed. The ends of this cord extend out through an opening in a cap member 34, preferably having sliding or screw-threaded engagement with the upper end of the bonnet 12 and enclosing and concealing the adjusting screw 14; the projecting ends of this cord or wire 33 are connected after the screw 14 has been adjusted and the cap 34 put in place by means of a seal 35, the arrangement of parts being such that without breaking the seal the cap 34 can not be removed to an extent sufficient to expose the screw 14 for adjustment.

In its working position the valve spindle is pressed downwardly by the spring 24 so that its lower end 17 bears against the bottom of the cavity 10, holding the feather to its seat. Should the pressure in the boiler or other vessel to which the valve is connected become great enough, the feather will be lifted off its seat, but the spindle will still remain in contact with the bottom of the recess 10. As above noted, the head of the spindle, when located in the cavity 10, is loose therein so that the feather is free to tip in any direction and thus free to seat itself when the pressure is relieved, even though the axis of the valve spindle may not be exactly perpendicular to the plane of the seat.

If for any reason it be desired to lift the valve feather from its seat manually, the operator raises the under end of the lever 29, thus bringing the surface 16 of the spindle head into contact with the similarly sloping surface 20 of the feather, whereupon the feather is lifted by further movement of the spindle.

It should be noted that the valve feather is of one-piece construction but that the feather and spindle head are so relatively arranged that the head may be advanced into the cavity in the feather by proper relative (rotary) movement of the parts, but when once within the enlarged cavity of the feather, the head can not be withdrawn by mere axial movement. Since, during the normal use of the valve, the surface 16 of the spindle head does not engage the surface 20 of the feather, there is no possibility that vibration or relative rotation of the spindle and feather will cause the head to regress through the passage 9 so as to be disengaged from the feather, and since the head only engages the surface 20 of the feather at infrequent intervals and then for very short periods only, the chances that the spindle head can accidentally enter into screw-threaded engagement with the feather are extremely remote. However, if it be desired to separate the feather from the head at any time, this may readily be accomplished by bringing them into proper contact and then rotating them relatively one to the other, thus permitting ready replacement of the feather if it should become worn through long use.

While I have illustrated one desirable arrangement of accomplishing the desired results, I wish it to be understood that equivalent arrangements are regarded as falling within the scope of the invention as set forth in the appended claims.

I claim:

1. A safety valve of the class described comprising a casing including a part having a valve seat, a bonnet portion and a cap, a feather cooperating with the valve seat, and means for loading the feather comprising a spindle having a head seated at one end in a chamber in the feather, said spindle having a shoulder spaced from the head, a compression spring disposed within the valve bonnet, one end of the spring resting on the spindle shoulder, an abutment member resting on the opposite end of the spring, an adjusting screw bearing at one end against said latter abutment member, said screw having threaded engagement with a threaded part of the bonnet, the other end of the screw being housed within said cap, a lock nut for holding the screw in adjusted position, said lock nut having a peripheral recess, a flexible member having a bight embracing the recessed portion of the lock nut, the ends of said flexible member extending outwardly through an opening in the cap, and means sealing the ends of said flexible member whereby to prevent removal of the cap and unauthorized adjustment of the screw.

2. A safety valve of the class described having in combination a valve body, a cap fitted to the top of the valve body, the cap having a hole in its side wall, a valve loading spring within the valve body, an adjusting screw for the spring, the end of said screw being disposed within said cap, a locking nut for the screw having a chamfered portion at its lower edge and a sealing wire having a bight surrounding the chamfered portion of the locking nut and passing out through the hole in the cap, and means sealing the ends of the wire to each other.

3. A safety valve of the class described comprising a casing including a part having a valve seat, a bonnet carried by said part, a valve feather cooperating with the seat, means for loading the valve feather, said loading means comprising an elongated spindle having an integral head at one end and a fixed abutment collar adjacent to its other end, a compression spring within the bonnet, one end of the spring resting upon the abutment collar of the spindle, a normally stationary abutment for the opposite end of the spring, the valve feather being of integral one-piece construction having an upward extension provided with an axial internally screw-threaded passage leading to a cavity in the body of the feather, the walls of the cavity comprising two truncated conical surfaces placed base to base, the cavity at its point of greatest diameter exceeding the diameter of the passage, the upper conical surface of the cavity merging into the lowermost of the screw threads of the passage and having substantially the same angle of slope as that of said screw threads, the passage having a substantial axial length preferably as great as the depth of the cavity, the head of the spindle normally fitting so loosely within the cavity as to permit the feather to rock independently of the spindle, the spindle head being shaped like two truncated cones placed base to base, said head being peripherally screw threaded at the junction of said cones, the screw-threaded portion of the head being of short axial length and of a diameter to engage the screw threads of the passage so that the head may be entered into or withdrawn from the cavity only by relative rotation of the head and feather, the bonnet having a pivotal support for a valve lifter, and a valve lifter pivoted upon said support and having an opening for the reception of the spindle of the loading device, said lifter being operative by engagement with the abutment collar of the spindle to lift the conical upper surface of the spindle head into engagement with the conical upper surface of the cavity in the feather, thereby to raise the feather from its seat.

4. A safety valve device comprising a valve casing having a valve seat therein, and a valve feather cooperating therewith having an upward extension provided with an axial internally screw-threaded passage leading to a cavity in the body of the feather, the walls of the cavity comprising two truncated conical surfaces placed base to base, the cavity at its point of greatest diameter exceeding the diameter of the passage, the upper conical surface of the cavity merging into the lowermost of the screw threads of the passage and having substantially the same angle of slope as that of said screw threads, the passage having a substantial axial length preferably as great as the depth of the cavity, a valve spindle having a head at one end normally fitting so loosely within the cavity as to permit the feather to rock independently of the spindle, the spindle head being shaped like two truncated cones placed base to base, said head being peripherally screw threaded at the junction of said cones, the screw-threaded portion of the head being of short axial length and of a diameter to engage the screw threads of the passage so that the head may be entered into or withdrawn from the cavity only by relative rotation of the head and feather, said spindle having a shoulder adjacent to but spaced from its other end, an annular collar resting upon said shoulder and constituting an abutment for a valve loading spring, a washer of less diameter than the collar concentric with and resting upon the latter, said collar and washer being designed to hold the loading spring in coaxial alignment with the spindle axis, the upper end of the spindle being headed over onto the washer to hold the parts in assembled fixed relation.

FRANK H. HOPKINS.